United States Patent
Landoll et al.

(10) Patent No.: US 6,394,734 B1
(45) Date of Patent: May 28, 2002

(54) TRAILER HAVING ACTUATABLE TAIL RAMP

(76) Inventors: Donald R. Landoll, 1201 N. 16th St., Marysville; Loren F. Wassenberg, 1975 Hwy. 77, Blue Rapids, both of KS (US) 66508

( * ) Notice: Subject to any disclaimer, the term of this patent is extended or adjusted under 35 U.S.C. 154(b) by 0 days.

(21) Appl. No.: 09/502,192

(22) Filed: Feb. 10, 2000

(51) Int. Cl.⁷ .................................................. B60P 1/43

(52) U.S. Cl. ...................... 414/480; 414/475; 414/537; 293/118; 280/149.2; 280/656

(58) Field of Search .................................. 414/537, 538, 414/482, 483, 484, 485, 474, 475, 480, 476, 477; 14/71.1, 71.3, 71.7; 280/149.2, 656; 254/5 R, 5 B, 3 R, 5 C, 2 R; 293/118

(56) References Cited

U.S. PATENT DOCUMENTS

| | | |
|---|---|---|
| 2,717,707 A | 9/1955 | Martin |
| 2,753,064 A | 7/1956 | Lesser |
| 2,789,714 A | 4/1957 | Norris |
| 3,292,967 A | 12/1966 | Peek |
| 3,474,921 A | 10/1969 | Rossoni |
| 3,901,398 A | 8/1975 | Brunch |
| 3,934,740 A | 1/1976 | Rumell |
| 3,987,919 A | 10/1976 | Weeks et al. |
| 4,083,573 A | 4/1978 | Baxter |
| 4,093,266 A | 6/1978 | Baxter |
| 4,125,198 A | 11/1978 | Landoll |
| 4,153,289 A | 5/1979 | Lewis et al. |
| 4,231,710 A | 11/1980 | Landoll |
| 4,277,096 A | 7/1981 | Lewis |
| 4,293,158 A | 10/1981 | Lewis et al. |
| 4,305,694 A | 12/1981 | Chan |

(List continued on next page.)

FOREIGN PATENT DOCUMENTS

DE    26625    * 12/1963

OTHER PUBLICATIONS

Brochure—Fontaine Specialized "Hydraulic Tail Trailer" (Cat. No. 85 (11/96)).

*Primary Examiner*—Frank E. Werner
(74) *Attorney, Agent, or Firm*—Hovey Williams LLP

(57) ABSTRACT

The trailer has a deck assembly that includes a level main deck portion and a tail hinged to the main deck for vertical swinging movement between a level transport position, a downwardly and rearwardly inclined ground-loading position, and an upwardly and rearwardly inclined dock-loading position. Raising and lowering of the tail between such positions is carried out by fore-and-aft movement of the shiftable undercarriage of the trailer, such undercarriage being located under the tail and generally behind the hinge when the trailer is in its roading position with the tail in its transport position. When the undercarriage is shifted forwardly beyond a lost motion segment of travel, the tail is allowed to progressively descend by gravity to its ground-loading position. Returning the undercarriage to its roading position beneath the tail causes the tail to be raised back to its transport position. If the tail is to be raised to dock height, the undercarriage is pulled forwardly until the forward termination of its lost motion segment of travel is reached, whereupon an air bag is actuated to elevate a lifting strut member into an enabled position in contacting engagement with the underside of the tail. Thereafter, rearward movement of the undercarriage causes the lifting strut member to push the tail upwardly to the dock-loading height and to hold the tail at such position. To lower the tail back to its transport height, the undercarriage is shifted forwardly and the air bag is deflated, lowering the strut member back to its disabled position and allowing the tail to become once again fully supported by the undercarriage. When the undercarriage is thereafter returned to its rearmost roading position, the trailer is ready for travel. Only one hydraulic cylinder is required for carrying out the tail actuation, together with an air bag actuator when raising of the tail to dock height.

11 Claims, 12 Drawing Sheets

U.S. PATENT DOCUMENTS

| | | |
|---|---|---|
| 4,372,727 A | 2/1983 | Fredrickson et al. |
| 4,492,507 A | 1/1985 | Landoll et al. |
| 4,516,902 A | 5/1985 | Matson |
| 4,568,235 A | 2/1986 | Bills, Jr. |
| 4,746,261 A | 5/1988 | Landoll et al. |
| 4,806,061 A | 2/1989 | Fenton |
| 4,906,041 A | 3/1990 | McKenzie |
| 4,958,845 A | 9/1990 | Parks |
| 4,988,258 A * | 1/1991 | Lutz et al. ............... 414/480 X |
| 5,013,056 A | 5/1991 | Landoll et al. |
| 5,033,931 A | 7/1991 | Mann |
| 5,094,583 A | 3/1992 | Bills et al. |
| 5,173,028 A * | 12/1992 | Heikkinen et al. ...... 414/475 X |
| 5,211,413 A | 5/1993 | Williams et al. |
| 5,215,426 A | 6/1993 | Bills, Jr. |
| 5,234,308 A | 8/1993 | Mann |
| 5,306,113 A | 4/1994 | Mann |
| 5,328,320 A * | 7/1994 | Farrow et al. .......... 414/917 X |
| 5,490,754 A | 2/1996 | Voelzke |
| 5,507,514 A | 4/1996 | Jacques |
| 5,667,231 A | 9/1997 | Dierks et al. |
| 5,775,868 A | 7/1998 | Mann |
| 5,782,514 A | 7/1998 | Mann |
| 5,816,767 A | 10/1998 | Mann |
| 6,179,544 B1 * | 1/2001 | Weseman ................... 414/480 |

* cited by examiner

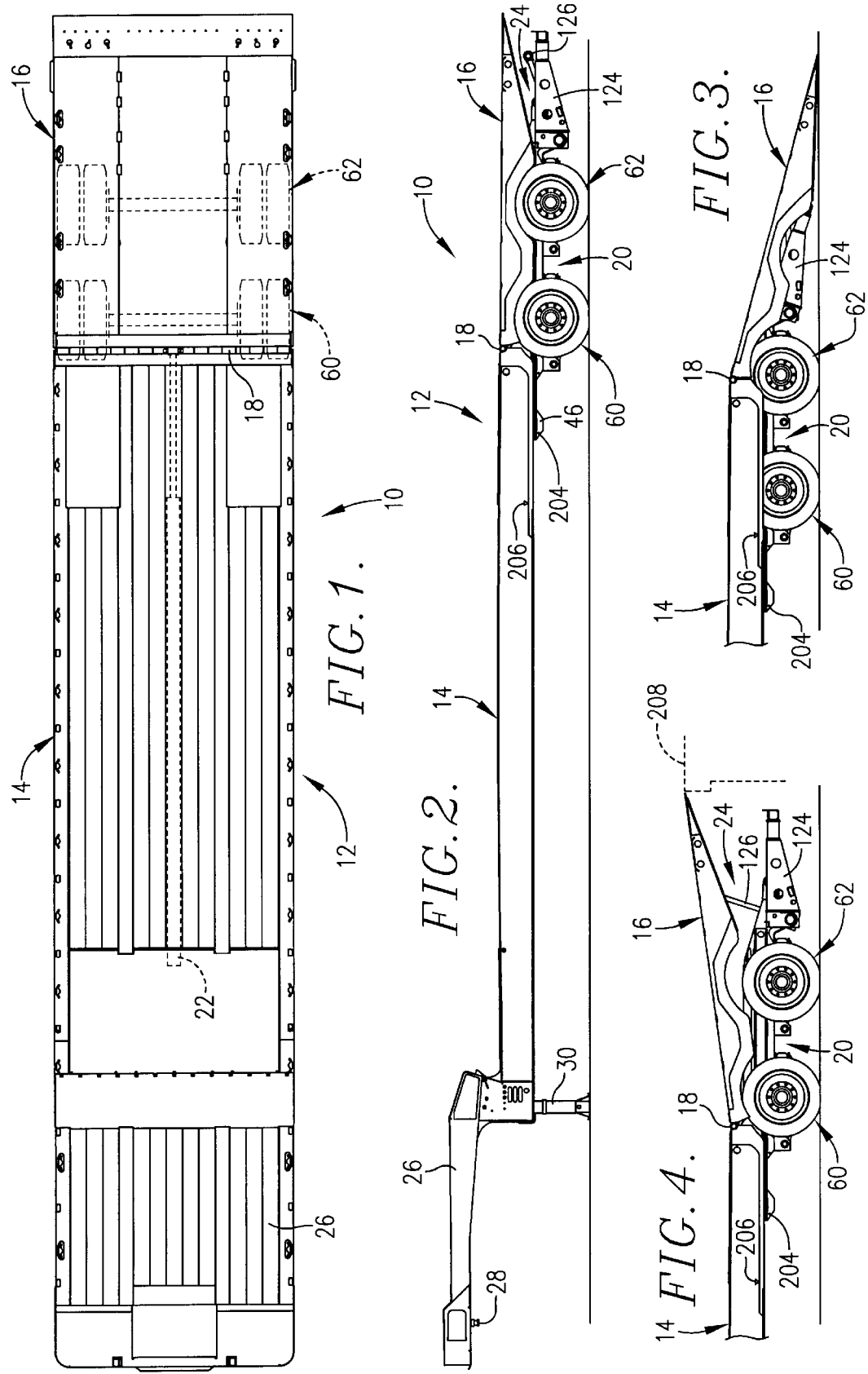

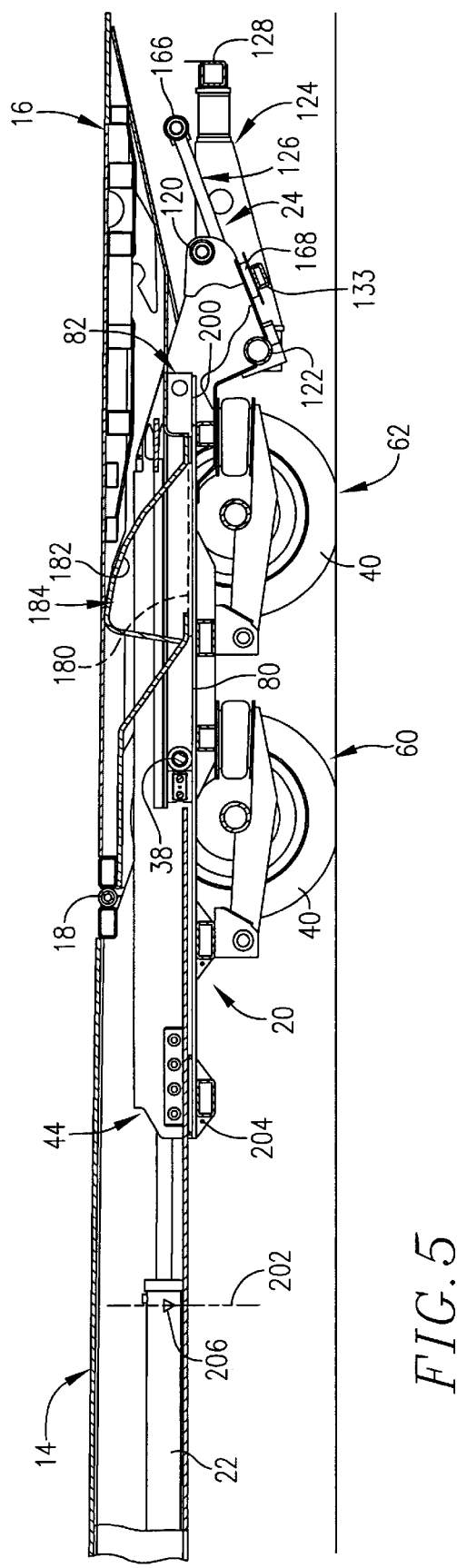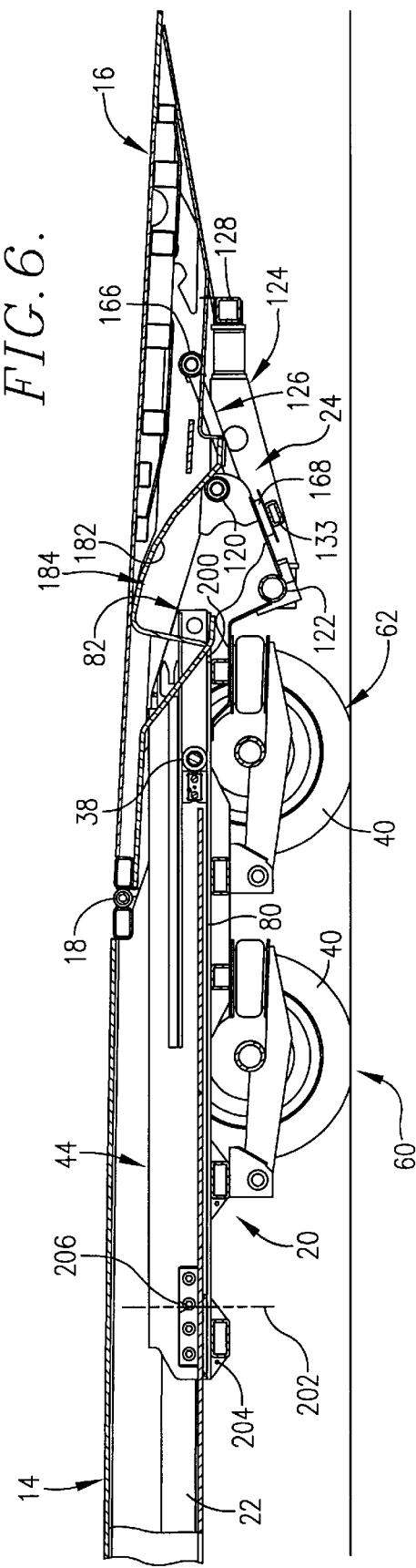

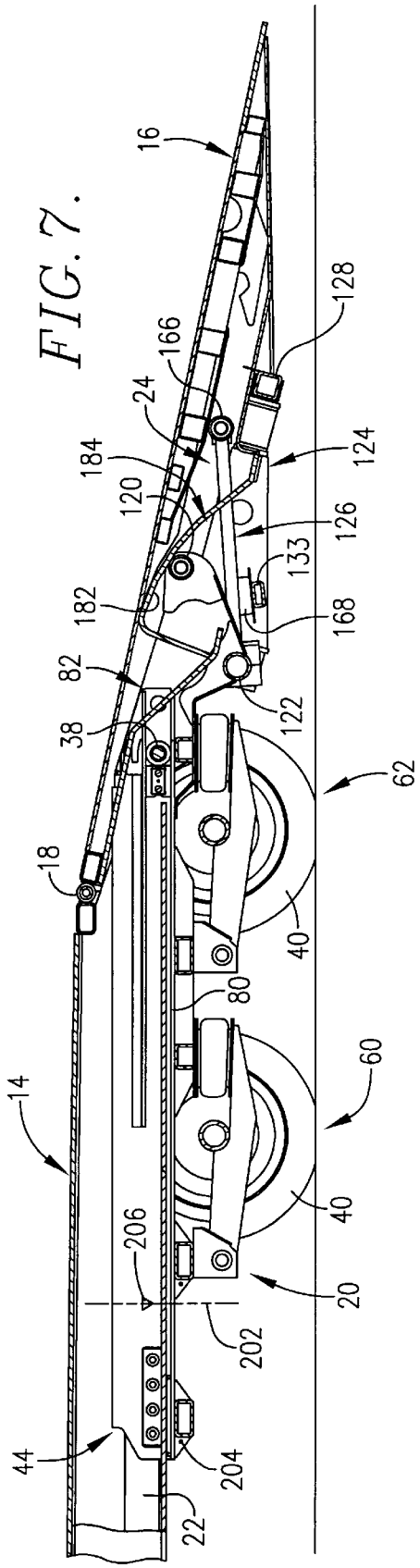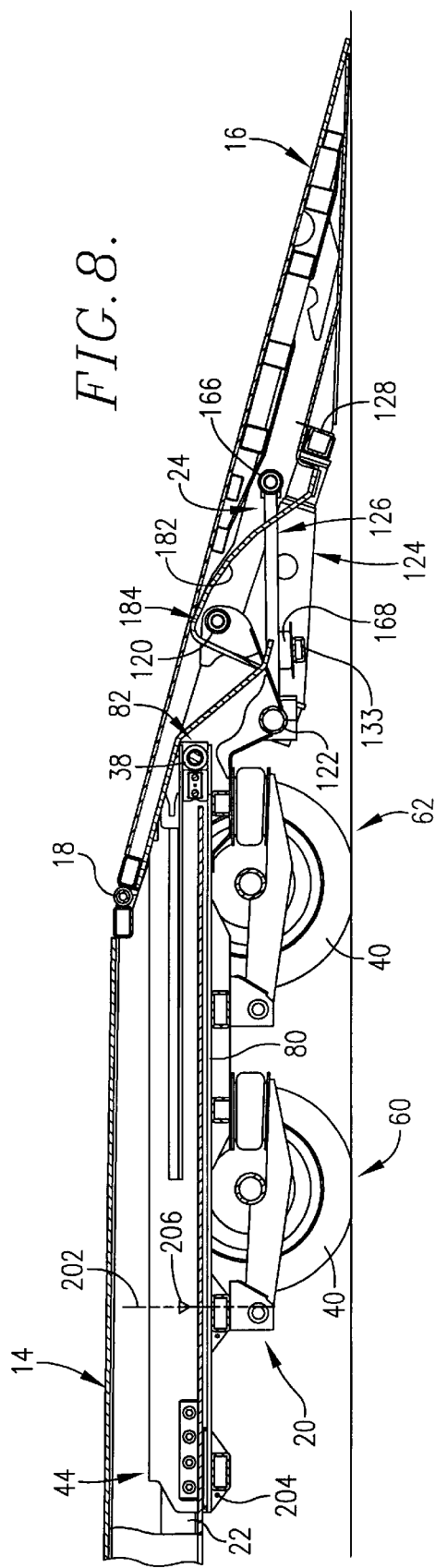

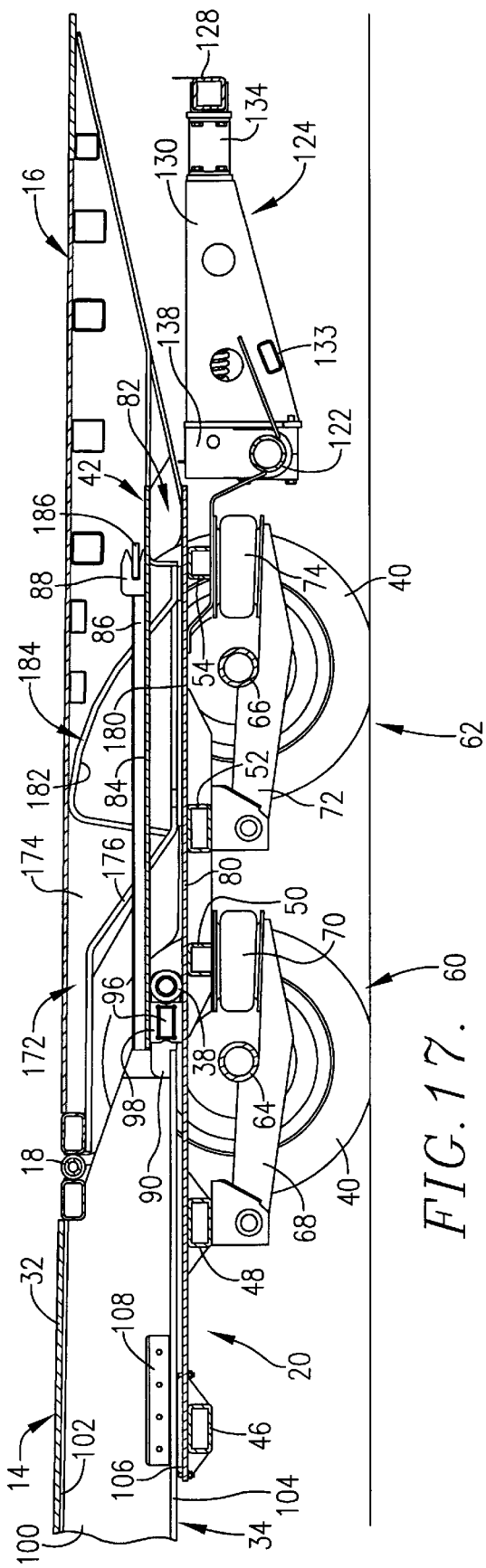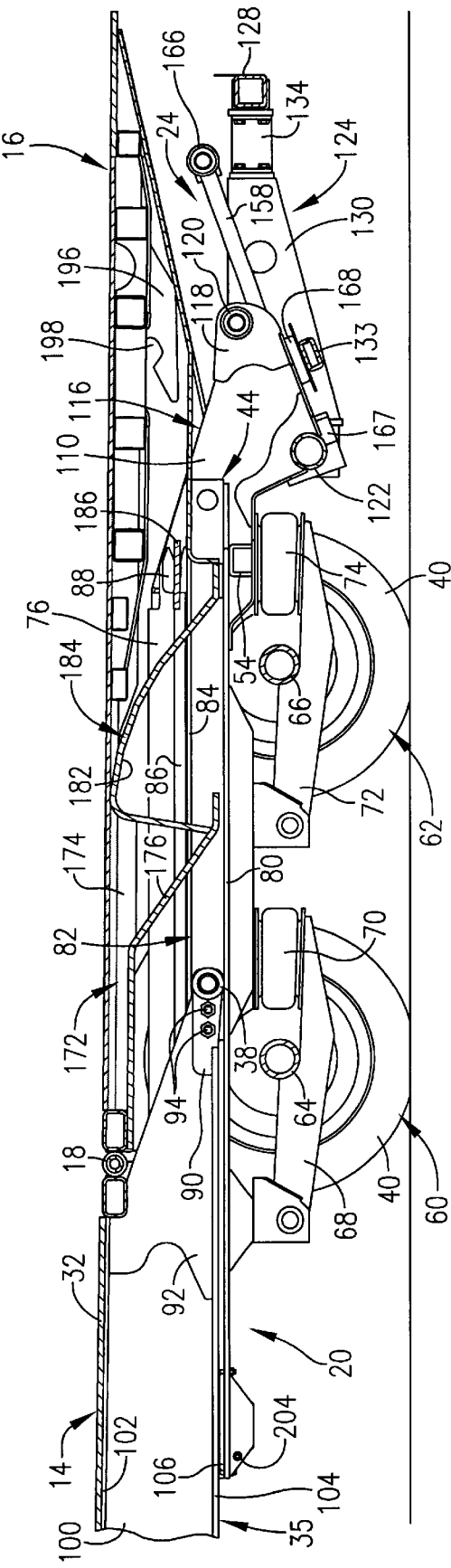

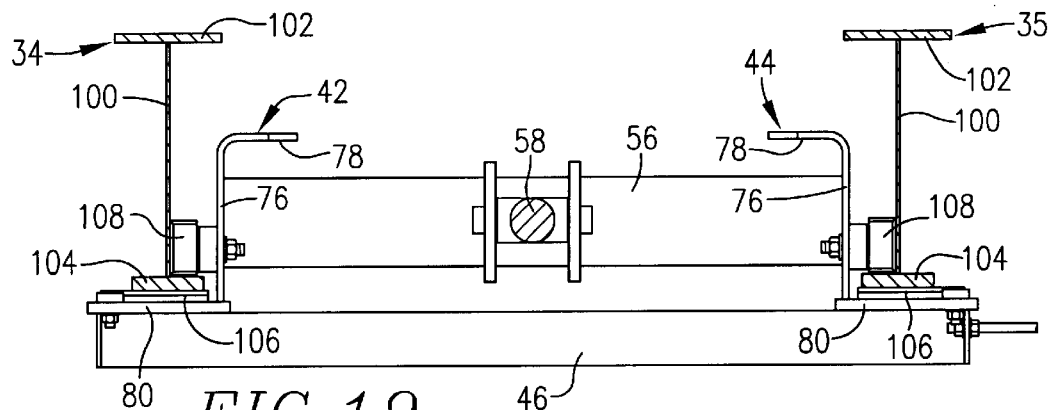
FIG. 19.
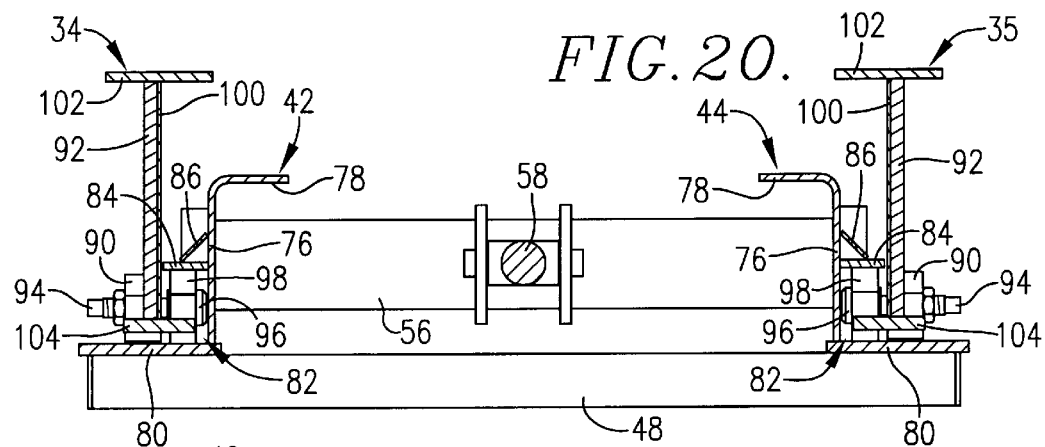
FIG. 20.
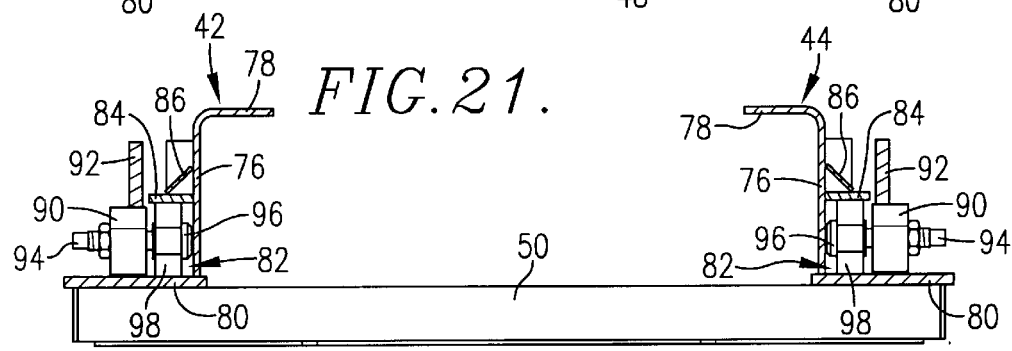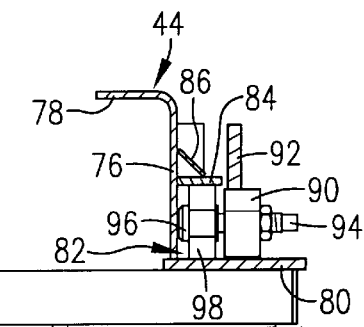
FIG. 21.
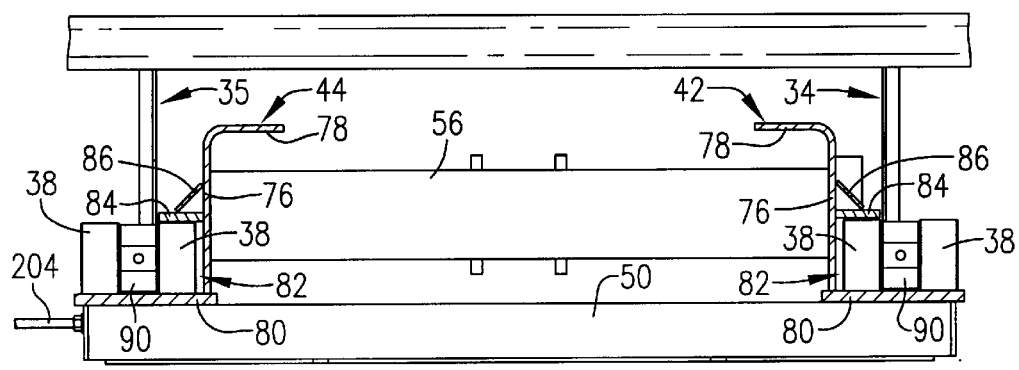
FIG. 22.

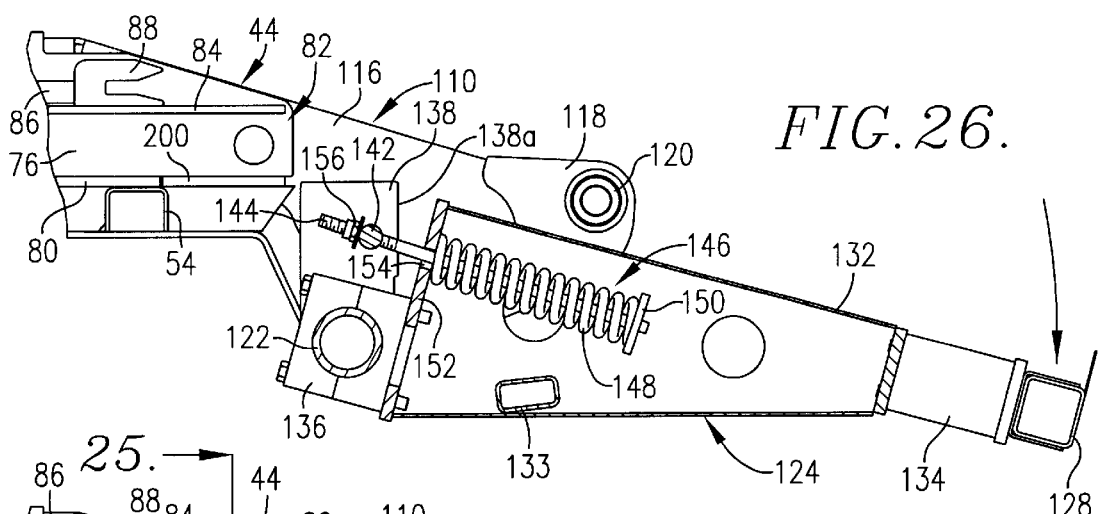
FIG. 26.
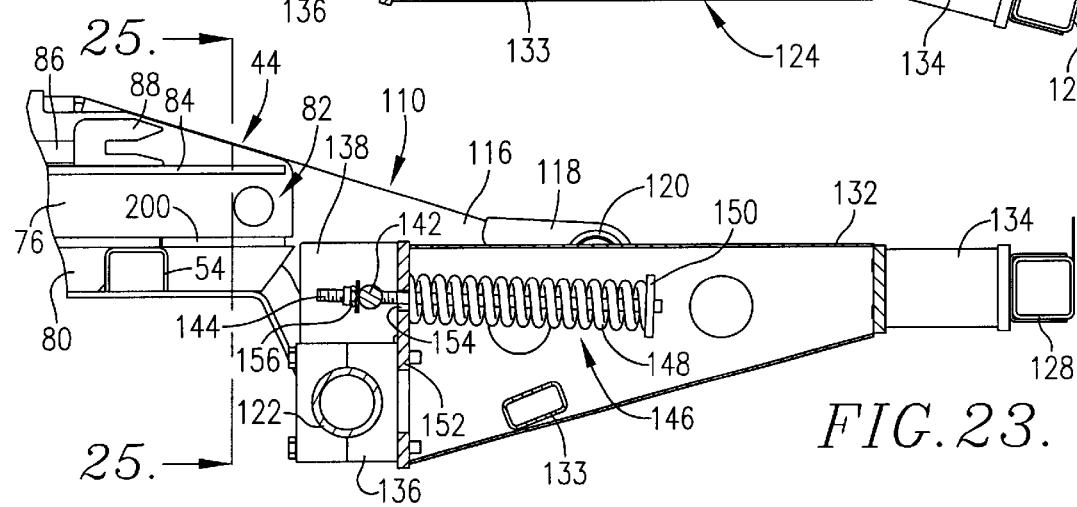
FIG. 23.
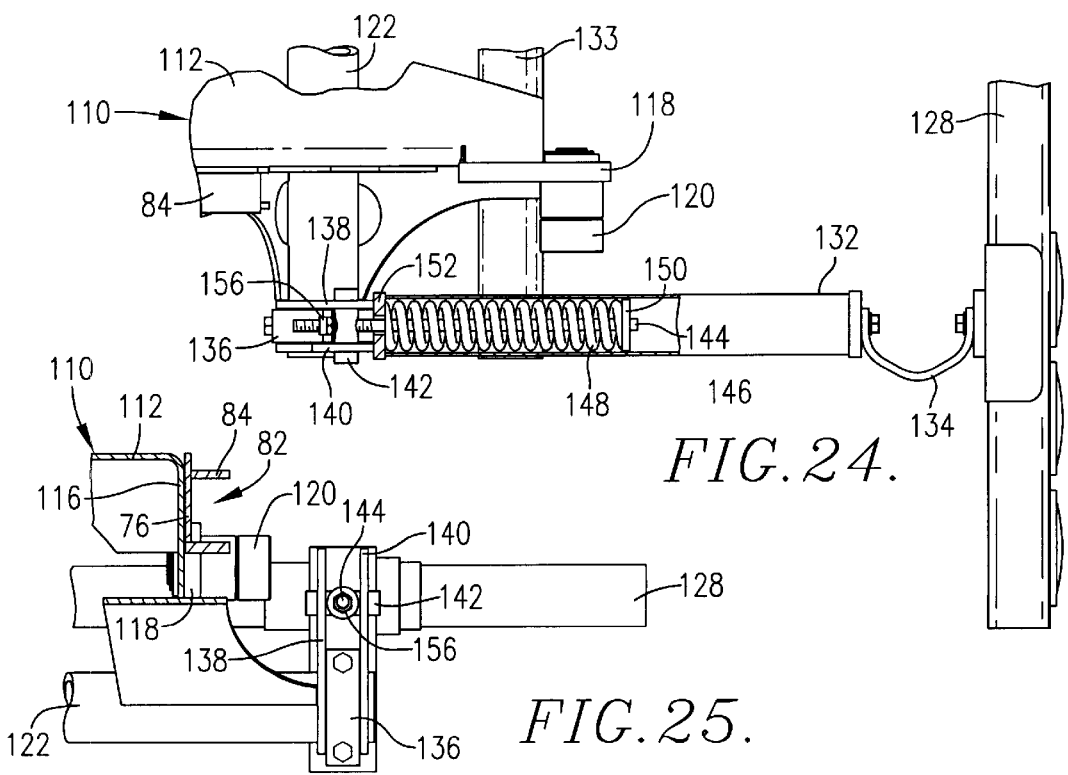
FIG. 24.
FIG. 25.

TRAILER HAVING ACTUATABLE TAIL RAMP

TECHNICAL FIELD

The present invention relates to heavy-duty trailers used for over-the-road hauling of heavy equipment of various kinds, such as dozers, tractors, fork lifts, trucks and other vehicles. More particularly, it relates to that category of trailers known as "tail trailers" or "hydraulic tail trailers" wherein a hinged rearmost portion of the trailer can be lowered to the ground or raised to a dock to serve as a ramp for loading and unloading purposes.

BACKGROUND

A wide variety of tail trailers are currently available. However, for the most part conventional tail trailers have complicated tail constructions that reduce reliability, increase maintenance requirements, increase down time during actuation and de-actuation of the tail, and increase the level of operator skill required. Increased costs due to the use of various latches, linkages and numerous hydraulic cylinders are also a significant negative factor.

Furthermore, the industry has thus far been unable to provide the public with a commercially successful tail trailer in which the load-supporting ground wheels of the trailer are located directly beneath the tail during over-the-road travel so as to obtain the significant operational advantages associated with that relationship. Instead, the common practice in the industry has been to locate the supporting undercarriage ahead of the hinge point of the tail so that the tail hangs out far beyond the wheels of the undercarriage. Among other things, this arrangement decreases the pay load available for the trailer because it increases the weight on the rear axle of the tractor-trailer rig while reducing the weight on the front axle at the tractor itself. Furthermore, without the undercarriage directly beneath the tail during roading, loads on the tail must be borne by hydraulic cylinders or other contrivances that operate the tail.

SUMMARY OF THE INVENTION

Accordingly, an important object of the present invention is to provide an improved tail trailer that overcomes the shortcomings of currently available tail trailers. In this regard, the present invention provides a simple, easy-to-operate tail trailer which can be quickly converted between loading and transport modes, and yet the supporting undercarriage and its ground wheels are located back under the tail in load supporting relationship therewith during over-the-road travel. While the tail can be quickly and easily lowered to the ground for using the tail as an upramp for loading equipment from the ground, it can also be easily raised up beyond a level condition to dock-height so as to serve as a downwardly inclined loading ramp from the dock, thus rendering the trailer extremely versatile. Notwithstanding the foregoing features, the trailer is provided with a sturdy bumper system beneath the tail that protects against accidental drive under situations by automobiles and the like.

Actuation of the tail between its transport, dock-loading and ground-loading positions is carried out through a single hydraulic power apparatus, preferably a single hydraulic cylinder. Such use of a single cylinder as the prime mover for manipulating the tail is made possible by making the undercarriage shiftable fore-and-aft of the main deck and its tail and by using such motion of the undercarriage to actuate the tail between its various positions.

The undercarriage has a relatively long path of travel which extends from a rearmost roading position of the undercarriage in which the ground wheels are fully under the tail to a forwardmost position of the undercarriage in which the ground wheels are almost entirely ahead of the hinge. Approximately the first half of the path of travel forward of the roading position is a lost motion segment during which the tail remains level. As the undercarriage moves beyond the halfway point, it clears the way for the tail to hinge downwardly by gravity toward the ground-loading position. Follower rollers on the rear end of the undercarriage roll up into parabolic pockets on the underside of the tail as the undercarriage moves forwardly, guiding and controlling the descent of the tail to the ground. To raise the tail back to its level, transport position, the undercarriage is returned toward the rear, during which rearward movement the tail is cammed back up to transport height. This raising movement can also be used to lift heavy loads situated on the tail.

A sturdy bumper assembly located beneath the tail extends horizontally rearwardly from the undercarriage when the tail is in its level transport position but yields to the downward force of the tail when the tail moves down to its ground-loading position, the bumper assembly being spring-loaded to provide such yielding during downward movement of the tail and to automatically return to a horizontal mode as the tail is re-established in its level condition.

The lost motion segment of the path of travel of the undercarriage can also be used for actuating the tail between its transport and dock-loading positions. To raise the tail to dock height, the undercarriage is first shifted forwardly to the forward limit of the lost motion segment. Then, a lifting strut, which is normally maintained down in a disabled position, is raised by an air bag actuator up into an enabled position in which it engages a socket on the underside of the tail. When the undercarriage is thereafter shifted rearwardly, such motion causes the lifting strut to push the tail upwardly until it reaches dock height. The strut then supports the tail in that position during onloading and offloading from the dock.

BRIEF DESCRIPTION OF THE DRAWINGS

FIG. 1 is a top plan view of a trailer incorporating the principles of the present invention;

FIG. 2 is a side elevational view thereof with the tail in its transport position;

FIG. 3 is a fragmentary side elevational view of the trailer showing the tail in the ground-loading position;

FIG. 4 is a fragmentary side elevational view of the trailer showing the tail in its dock-loading position;

FIGS. 5–8 are enlarged, fragmentary, longitudinal cross-sectional views through the trailer illustrating the manner in which the tail is actuated between its transport and ground-loading positions;

FIG. 16 is a fragmentary, longitudinal cross-sectional view through the trailer taken substantially along line 16—16 of FIG. 15 and illustrating the undercarriage in its rearmost, roading position;

FIG. 17 is a fragmentary, longitudinal cross-sectional view through the trailer taken substantially along line 17—17 of FIG. 15, again with the undercarriage in its rearmost, roading position;

FIG. 19 is a fragmentary, transverse cross-sectional view through the trailer taken substantially along line 19—19 of FIG. 18;

FIG. 20 is a fragmentary, transverse cross-sectional view through the trailer taken substantially along line 20—20 of FIG. 18;

FIG. 21 is a fragmentary, transverse cross-sectional view through the trailer taken substantially along line 21—21 of FIG. 18;

FIG. 22 is a fragmentary, transverse cross-sectional view through the trailer taken substantially along line 22—22 of FIG. 18;

FIG. 23 is an enlarged, fragmentary detail view of the bumper assembly at the rear of the undercarriage, the bumper being illustrated in its normal horizontal condition and parts being illustrated in cross-section for clarity;

FIG. 24 is a fragmentary, top plan view of the bumper assembly with parts broken away and shown in cross-section to reveal details of construction;

FIG. 25 is a fragmentary, vertical cross-sectional view of the rear of the undercarriage taken substantially along line 25—25 of FIG. 23 to reveal details of construction of the bumper assembly; and FIG. 26 is a fragmentary detail view similar to FIG. 23 but illustrating the bumper in a downwardly depressed position as it would be when the tail is in its ground-loading position.

DETAILED DESCRIPTION

Figure 9:
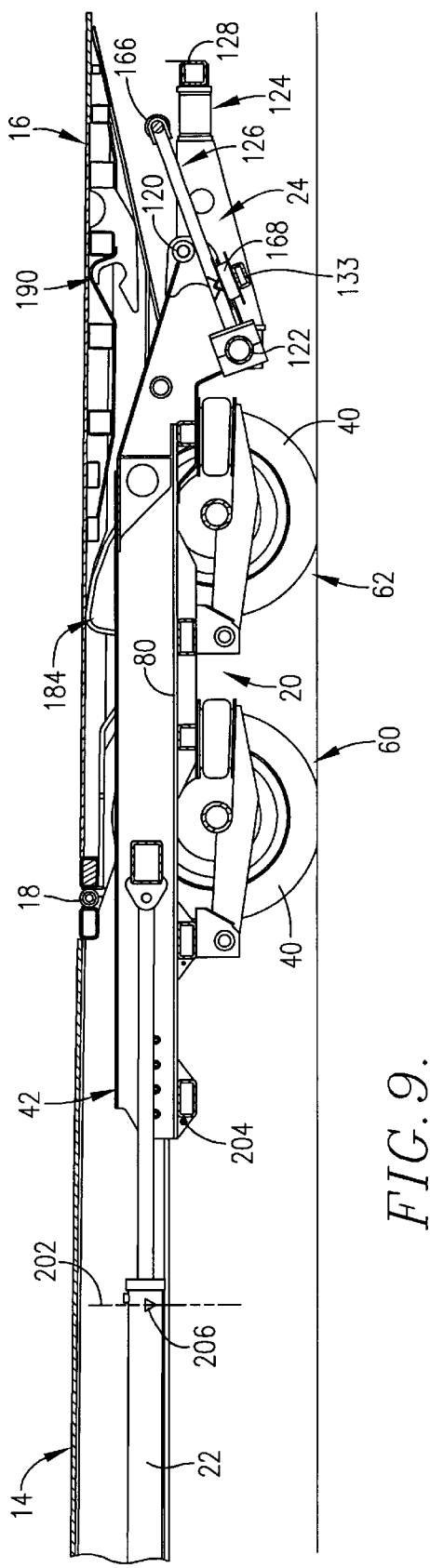
FIGS. 9–12 are enlarged, fragmentary, longitudinal cross-sectional views through the trailer illustrating the manner in which the tail is actuating between its transport and dock-loading.

Referring initially to FIGS. 1–4, the trailer 10 broadly includes a deck assembly 12, including a main deck 14 and a tail 16 hinged thereto by a transverse hinge 18; a traveling undercarriage 20 shiftable fore-and-aft of the deck assembly 12; power apparatus 22 in the form of a single hydraulic cylinder for shifting the undercarriage 20 fore-and-aft; and mechanism broadly denoted by the numeral 24 for operably coupling the undercarriage 20 with the tail 16 in such a manner that fore-and-aft motion of the undercarriage 20 is used to raise and lower the tail 16 between its level, transport position of FIG. 2, its downwardly inclined ground-loading position of FIG. 3, and its upwardly inclined dock-loading position of FIG. 4.

The trailer 10 may take a variety of different forms overall, the illustrated form being that of a trailer having an upper deck 26 at its front end that has a downwardly projecting pintle 28 by which the trailer is coupled with a fifth wheel of a towing tractor vehicle (not shown). A stand 30 projects down from the main deck portion 14 adjacent its forward end to support the front end of the trailer during those times when the trailer is not hitched to the tractor.

Figure 18:
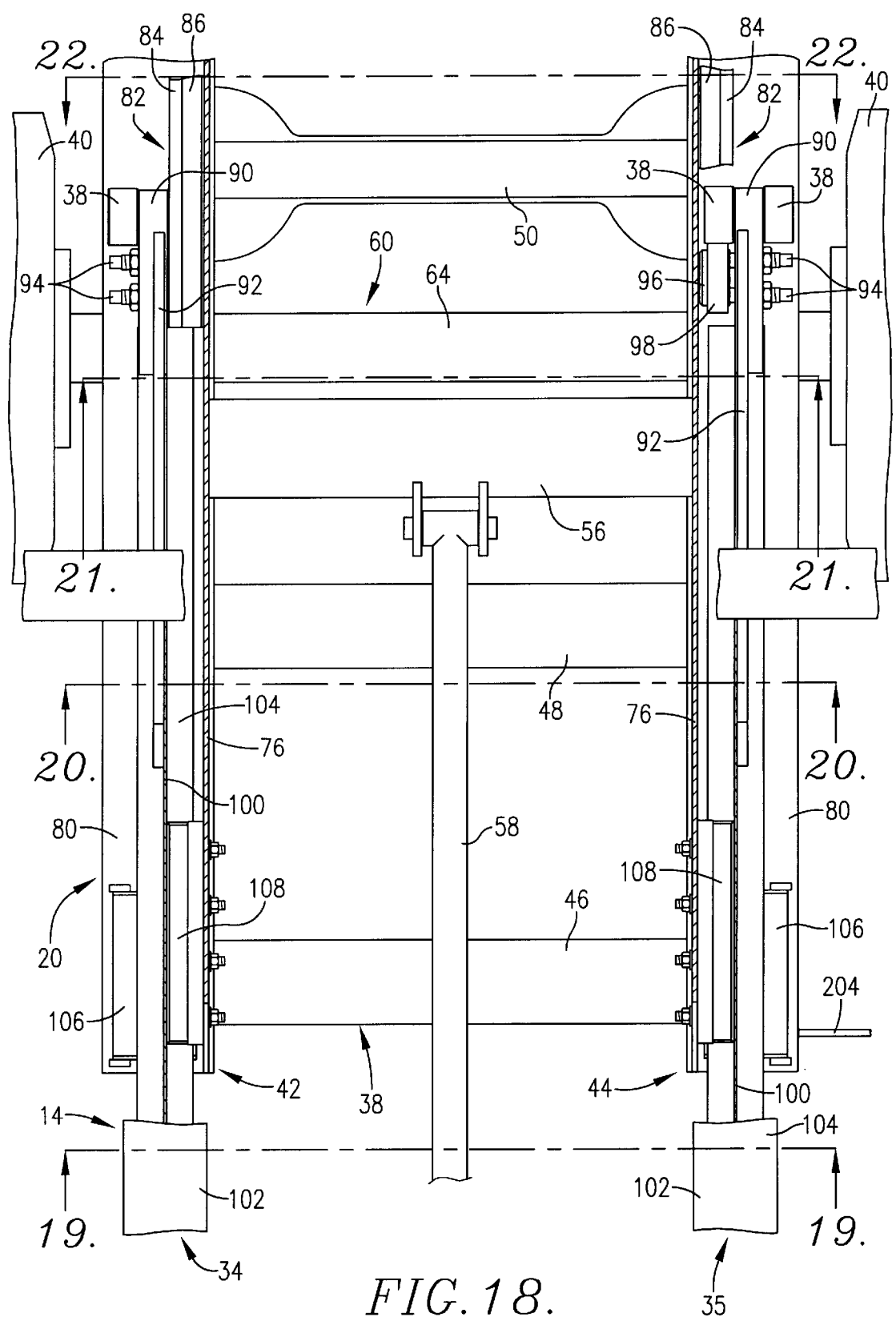
FIG. 18 is a fragmentary, enlarged, top plan view of the trailer with the deck removed to reveal details of construction, the undercarriage being shown in its rearmost, roading position.

Details of construction of the trailer 10 are illustrated primarily in FIGS. 13–26, while the operation of the trailer is depicted primarily in FIGS. 5–12. Accordingly, in the following detailed description of the manner in which the trailer 10 is constructed, reference should be made primarily to FIGS. 13–26. The main deck 14 includes, in relevant part, a top supporting surface 32 and a pair of laterally spaced, centrally disposed, structural I-beams 34 and 35 that support the surface 32 and run essentially the full length of the main deck 14. The deck also includes a pair of outboard beams 36 and 37 as shown in FIG. 15. A transverse structural element (not shown) is used as an anchor point for the forward end of the hydraulic cylinder 22. As shown particularly in FIGS. 16 and 18, the I-beams 34 and 35 terminate a short distance rearwardly of the hinge 18, each beam having a set of rollers 38 at such point of termination.

Figure 14:
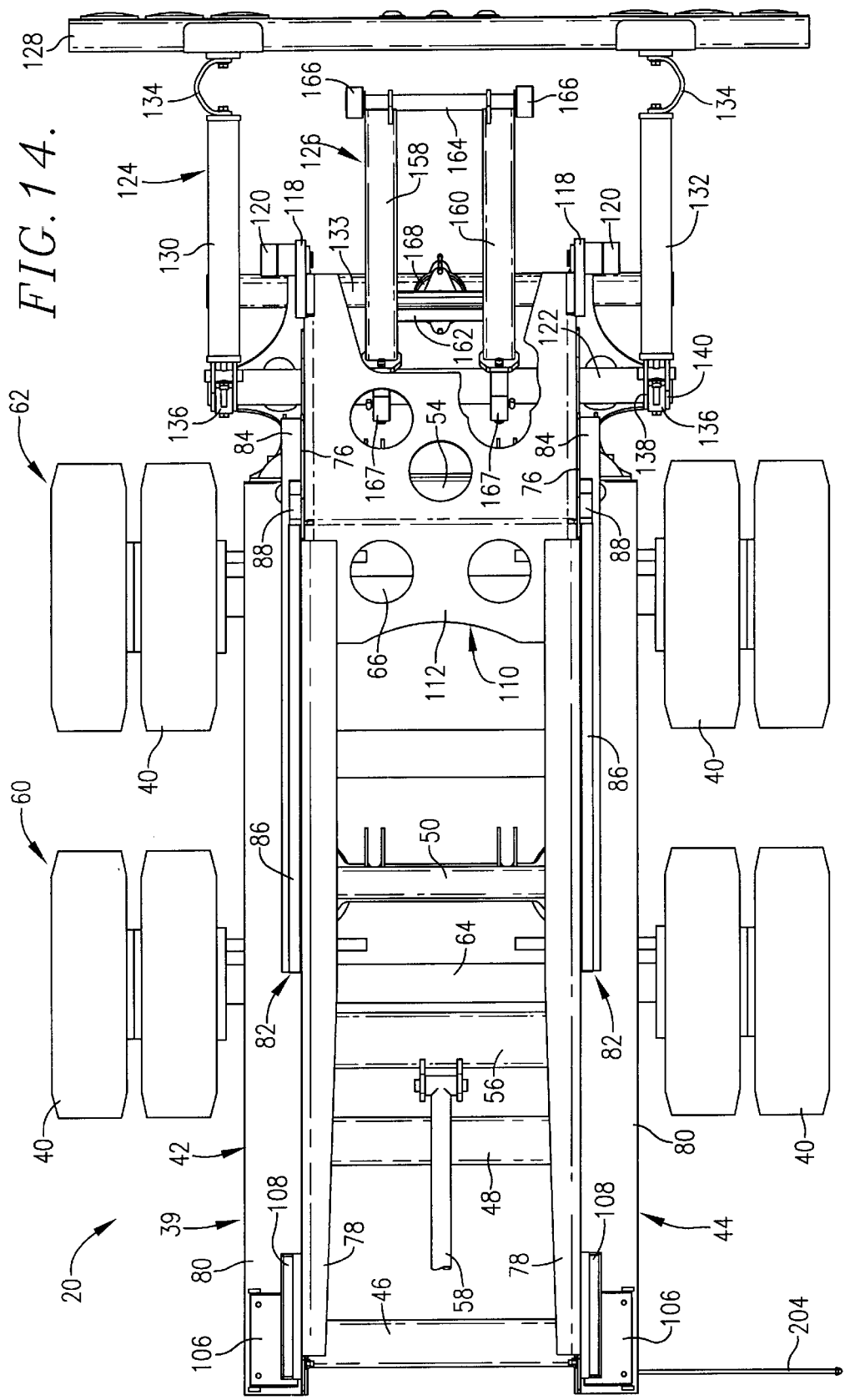
FIG. 14 is an enlarged, top plan view of the traveling undercarriage of the trailer.
Figure 15:
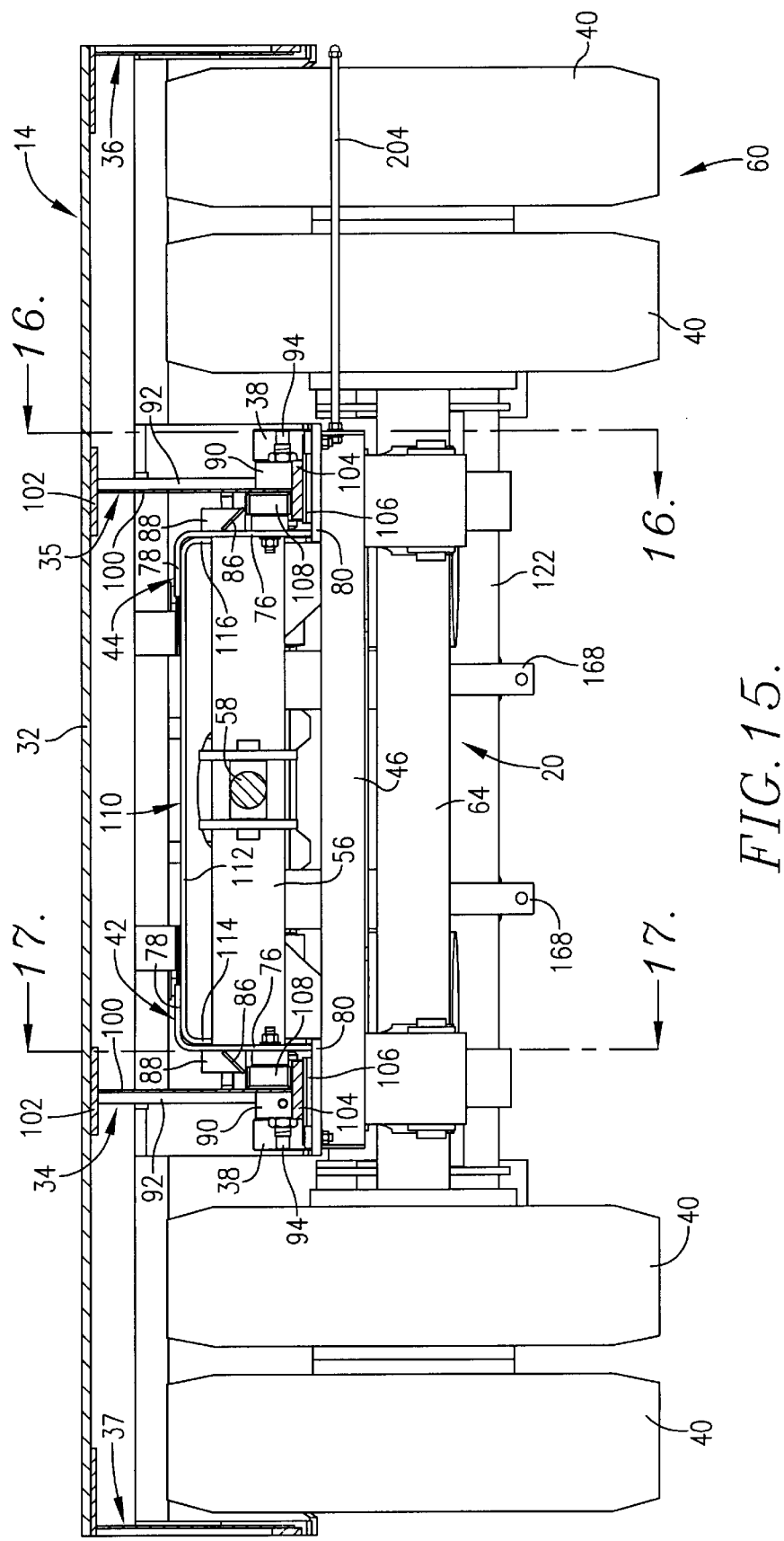
FIG. 15 is an enlarged, transverse cross-sectional view through the trailer taken just forwardly of the front end of the undercarriage and looking toward the rear.

The undercarriage 20 is shown in its entirety in the plan view of FIG. 14. Generally speaking, undercarriage 20 includes a frame 39 supported by a plurality of ground wheels 40 on opposite sides of the trailer. As its primary components, frame 39 includes a pair of fore-and-aft, laterally spaced beam assemblies 42 and 44 that are mirror images of one another, and a plurality of transverse structural members 46, 48, 50, 52 and 54 interconnecting the beam assemblies 42 across the bottom thereof at fore-and-aft spaced locations. A single transverse beam 56 extending between the beam assemblies 42,44 at a level above that of the structural members 46-54 serves as an anchor point for the rear end of the rod 58 of cylinder 22.

The ground wheels 40 are associated with a pair of wheel and axle assemblies 60,62 beneath the frame 39 and comprising a part of the undercarriage 20. Axle assemblies 60,62 include a pair of axles 64 and 66 respectively that journal the ground wheels 40 for rotation. Axle 64 is carried by a pair of arms 68 (FIGS. 16 and 17) pivoted at their front ends to the transverse member 50. An air suspension unit 70 at the rear of the arms 68 is trapped between the latter and the cross-member 52 so as to provide an air ride for the trailer. The axle 66 of wheel and axle assembly 62 has similar support arms 72 and air suspension units 74.

As illustrated particularly in FIGS. 19–22, each of the beam assemblies 42 and 44 is generally transversely Z-shaped, each having an upstanding central web 76, an inturned top flange 78, and an outwardly projecting, horizontal bottom flange 80 that is somewhat thicker than the integral web/flange combination. At the rear of the undercarriage 20 each beam assembly 42,44 has a fore-and-aft extending track 82 (see also FIGS. 14 and 16–18) defined on the outboard side of the upstanding web 78 for the purpose of confining and guiding the inboard roller 38 of the corresponding set of rollers at the rear end of the deck beam 34 or 35. The track 82 is defined between the lower flange 80 of the undercarriage beam assembly 42 or 44 on the one hand and a horizontally extending, flat cover strap 84 on the other hand that is spaced above the lower flange 80 and projects laterally outwardly from the web 76. The cover strap 84 extends rearwardly from a point almost directly above the axle 64 of wheel and axle 60 to a point slightly rearwardly of the rear air suspension unit 74 of the rear wheel and axle assembly 62. The outboard roller 38 of each set of rollers on the rear end of the main deck 14 is outboard of the corresponding cover strap 84 but, like its inboard companion roller 38, rides upon the lower flange 80 of the corresponding beam assembly 42 or 44. An inclined gusset bar 86 interconnects the top surface of each cover strap 84 and the adjacent web 76 of the corresponding beam assembly 42 or 44. Each gusset bar 86 begins at its front end at the forward end of the cover strap 84 and terminates at its rear end short of the rear end of the corresponding cover strap. Each gusset bar 86 is provided with a fork-shaped retainer 88 at its rear end for a purpose that will be hereinafter described.

Each set of rollers 38 is attached to the rear end of the corresponding deck beam 34 or 35 by virtue an attachment block 90 that is welded to a stiffening plate 92 secured to the corresponding deck beam 34 or 35. As noted particularly in FIGS. 16 and 17, each stiffening plate 92 tapers in height as the rear end thereof is approached from a forward location on the main deck 14. Each block 90 has a pair of transverse adjusting bolts 94 extending transversely therethrough and supporting an alignment pad 96 against the outer surface of the upright web 76 of the corresponding beam assembly 42 or 44. Thus, in effect, the two undercarriage beam assemblies 42,44 are captured between the two pads 96 at the rear of the main deck 14 so as to confine the undercarriage 20 against lateral movement and align it relative to the main deck 14. Bolts 94 can be adjusted to true the alignment. Each of the pads 96 is surrounded by an anti-friction guide block 98 of rectangular configuration that rides within the corresponding track 82 immediately in front of the inboard guide roller 38.

As noted particularly in FIGS. 15 and 18–20, each of the I-beams 34,35 of the main deck 14 includes an upright web 100, a transverse top flange 102 across the upper end of the web 100, and a transverse lower flange 104 across the bottom end of the web 100. The bottom flange 104 rests upon a horizontal slide plate 106 of ultra high molecular weight material or the like that is secured to the upper surface of the forwardmost end of the lower flange 80 of each undercarriage beam assembly 42,44. Directly overlying each lower flange 104 in registration with the corresponding slide plate 106 and on the inboard side of the corresponding web 100 of beam 34 or 35 is a rectangular slide block 108 of ultra high molecular weight material or the like, such slide block 108 being affixed to the outboard face of the upright web 76 of the corresponding undercarriage beam assembly 42 or 44. Thus, at the front end of the undercarriage 20, the bottom flanges 104 of the deck I-beams 34,35 are slidably trapped between slide plates 106 and slide blocks 108 on the undercarriage 20. On the other hand, at the mid-point of the undercarriage 20, the inboard rollers 38 and the guide blocks 98 of the main deck 14 are trapped within the tracks 82 on the undercarriage 20. Thus, the rear end of the main deck 14 is supported by the undercarriage 20, yet the undercarriage 20 can be shifted fore-and-aft relative to the main deck 14 through the action of the hydraulic cylinder 22.

The frame 39 of the undercarriage 20 has an extension 110 in the nature of a formed structural plate that projects rearwardly beyond the rear ends of the beam assemblies 42,44. Extension 110 is of inverted, generally U-shaped configuration and projects downwardly and rearwardly on an incline away from the rear ends of the beam assemblies 42,44. The extension 110 has a top web 112 and a pair of opposite, upright sidewalls 114 (FIG. 15) and 116 that project downwardly from the top web 112. The sidewalls 114 and 116 fit between the opposed vertical webs 76 of the beam assemblies 42,44 and are welded thereto. The top web 112 is horizontal in the area of the beam assemblies 42,44, but inclines downwardly and rearwardly beyond the rear ends of the beam assemblies 42,44. At its lower rear end, the formed extension 110 has a pair of rearwardly projecting ears 118 welded thereto which, in turn, each rotatably support a follower roller 120 forming part of the operating mechanism 24 for raising and lowering the tail 16.

The rollers 120 are disposed in fore-and-aft alignment with and at substantially the same height as the forwardly disposed bottom flanges 80 of the beam assemblies 42,44. A cross tube 122 extends across the lower portion of the formed extension 110 ahead of and below the rollers 120 and projects laterally outwardly beyond the two sidewalls 114, 116 of extension 110. Cross tube 122 serves as a support for a bumper assembly 124 and for a special lifting strut member 126 that forms part of the mechanism 24 for raising and lowering the tail 16.

Dealing first with the bumper assembly 124, and with reference primarily to FIGS. 14 and 23–26, such assembly includes a transverse, tubular bumper 128 supported at the rear ends of a pair of laterally spaced arms 130 and 132 that are pivotally attached at their forward ends to the cross tube 122. A transverse beam 133 rigidly interconnects the arms 130 and 132 a short distance rearwardly of the cross tube 122. Each arm 130,132 has a resilient, generally C-shaped energy absorbing strap 134 that secures the bumper 128 to the rear end of the corresponding arm 130 or 132. Each arm 130,132 at its forward end has a bearing assembly 136 that rotatably secures the arm to the exterior of the cross tube 122 so that the entire bumper assembly 124 can pivot up and down about the longitudinal axis of the cross tube 122.

Each bearing assembly 136 is sandwiched between a pair of upstanding plates 138 and 140 that are fixed to the cross tube 122 and do not rotate with the bearing assembly 136. Adjacent their upper ends, each set of plates 138,140 rotatably supports a cross shaft 142 that in turn receives the threaded end of a fore-and-aft guide rod 144 associated with and part of a compression spring assembly 146 that biases the corresponding arm 130 or 132 upwardly toward a level condition as illustrated, for example, in FIG. 23. Each spring assembly 146 includes not only the rod 144, but also a coiled compression spring 148 that encircles the rod 144 and is trapped between a stop 150 on the outer end of the rod 144 and aback wall 152 of the arm 130 or 132, which is basically of hollow construction. The rod 144 passes through a hole 154 in the back wall 152 and has a nut 156 on its threaded portion that extends rearwardly beyond the shaft 142 for the purpose of retaining the rod 144 within the shaft 142 against the pulling force exerted thereon by the compression spring 148. The rearmost edges 138a of the upright plates 138 (FIG. 26) serve as limit stops to limit the extent of upward swinging of the bumper assembly 124 under the influence of the spring assemblies 146, the back wall 152 of the arms 130,132 coming into abutting engagement with the stop surfaces 138a when the bumper assembly 126 is in the level condition of FIG. 23.

The lifting strut member 126 includes a generally H-shaped frame (FIG. 14) comprising a pair of laterally spaced fore-and-aft extending members 158 and 160 and a transverse member 162 spanning the distance between the two members 158,160 intermediate their opposite ends and rigidly interconnecting the same. A transverse shaft 164 interconnecting the rear ends of the members 158,160 journals a pair of rollers 166 at its opposite ends. At their forward ends, the members 158 and 160 are pivotally attached to the cross tube 122 by a pair of respective bearing assemblies 167. Thus, the lifting strut member 126 can swing up and down about the transverse pivotal axis defined by the cross tube 122.

Figure 10:
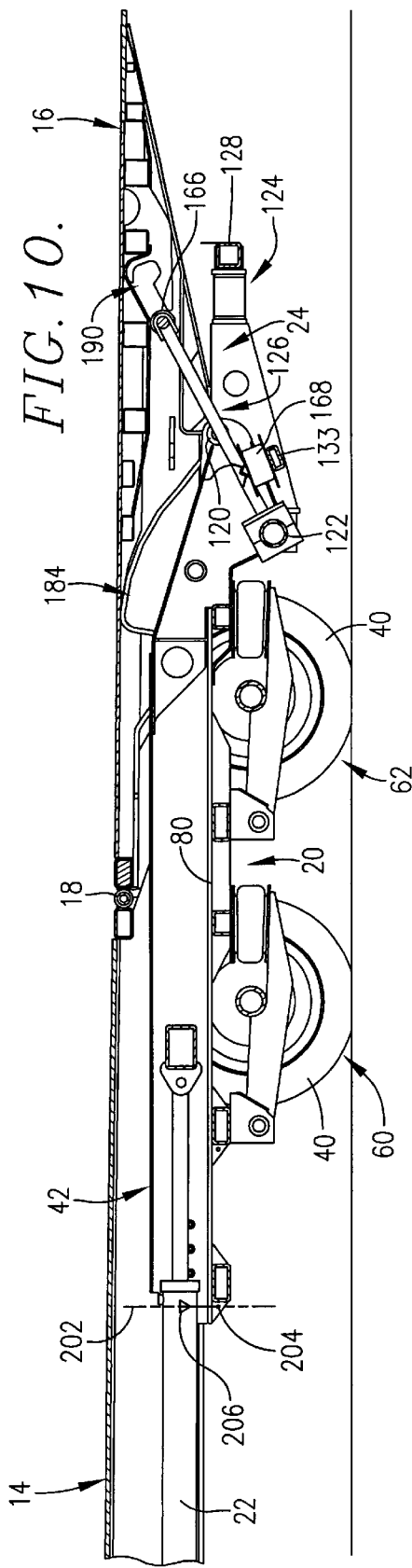

By virtue of its pivotal mounting on the cross tube 122, the strut member 126 is swingable between a lower standby or disabled position as illustrated in FIG. 9 and a raised or enabled position as illustrated in FIG. 10. An actuator in the form of an air bag 168 is disposed on the transverse beam 133 in position for effecting movement of the lifting strut member 126 between its enabled and disabled positions. Airbag 168 forms part of the mechanism 24 for actuating the tail 16. As seen in FIG. 14, the air bag 168 is disposed substantially in the center of the beam 133 directly beneath the transverse member 162 of strut member 126 such that the strut member 126 rests upon and is supported by the air bag 168 when the strut member 126 is in its disabled and enabled positions.

Figure 13:
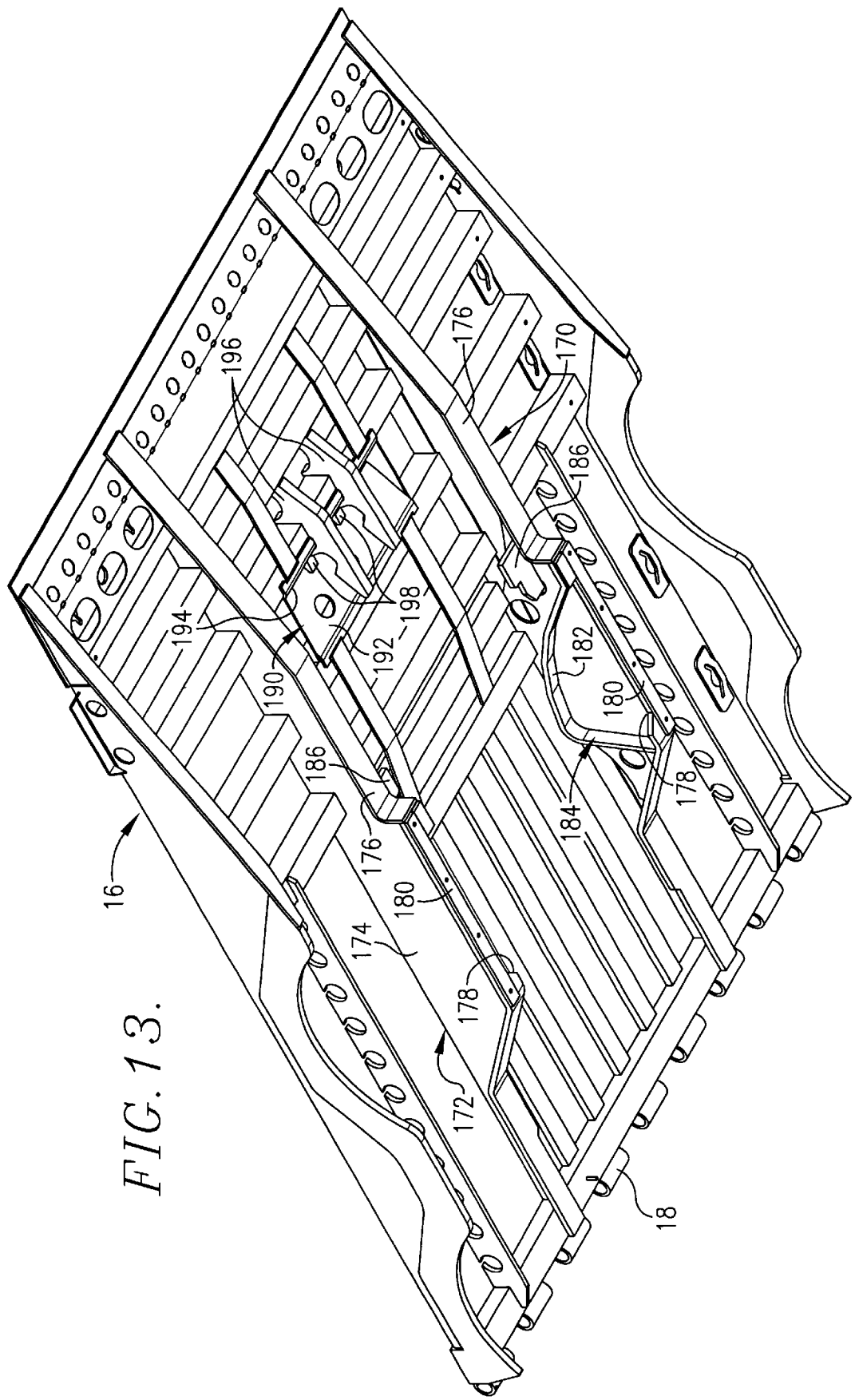
FIG. 13 is an isometric view of the underside of the tail.

As shown in detail in FIG. 13, the tail 16 has a pair of laterally spaced apart, for-and-aft extending beams 170 and 172 extending essentially the full fore-and-aft length of the tail. Each beam 170,172 has a lower extremity that is cut out in an irregular pattern, the beam including an upright web 174 and a lowermost flange 176 extending along the irregular lower extremity. Near their fore-and-aft midpoints, the beams 170,172 are full height, and each flange 176 is provided with a longitudinally extending, elongated notch 178 in that portion of the flange which projects in an inboard direction from the web 174. Beside the notch 178 along the outboard portion of the flange 176 in that same area is an anti-friction glide strip 180 of ultra high molecular weight material or other substance. The strips 180 overlie and slidably engage the lower flanges 80 of undercarriage beam assemblies 42,44 when the tail 16 is in its level transport position and the undercarriage 20 is positioned for over-the-road travel (see also FIG. 17). Thus, when the tail 16 is in its level transport position and the undercarriage 20 is its rearmost roading position, the load of the tail 16 and any equipment supported thereon is borne by the undercarriage 20 via engagement of the tail beams 170,172 with the lower flanges 80 of undercarriage beam assemblies 42 and 44. Shifting movement of the undercarriage 20 relative to the tail 16 as facilitated by the glide strips 180.

The notches 178 in the lower flanges 176 of tail beams 170,172 are disposed in fore-and-aft alignment with corresponding rollers 120 at the rear of undercarriage 20. While such rollers 120 are spaced a substantial distance rearwardly from the notches 178 when the undercarriage 20 is in its rearmost roading position as in FIG. 16, the rollers 120 are disposed to enter the notches 178 when the undercarriage 20 has been shifted sufficiently far forwardly that the rollers 120 are in registration with the notches 178 and the strips 180 are no longer riding on the flanges 80 of undercarriage beam assemblies 42,44 (as seen in FIG. 6). In lieu of a portion of the flange 176 for the rollers 120 to bear against at this time, each of the tail beams 170,172 is provided with an upwardly arched, generally parabolic strap 182 that is fixed to the inboard surface of the web 174 of the beam 170 or 172. Each upwardly arched strap 182 thus defines an open bottom receiving pocket 184 for the corresponding follower roller 120, such pockets 184 comprising part of the tail actuating mechanism 24.

As illustrated in FIGS. 7 and 8, the follower rollers 120 can travel up into the pockets 184 in load-bearing engagement with the straps 182 as the undercarriage 20 continues to shift forwardly toward its forwardmost position of FIG. 8. It will be noted that when the undercarriage 20 is in its forwardmost, FIG. 8 position, the tail 16 has engaged the ground and the rollers 120 have actually moved slightly forwardly of the straps 182 such that the ground surface is now bearing the load of the tail 16 and any equipment thereon, rather than the rollers 120. The forwardmost portions of the tail beams 170,172 are cut out so as to provide clearance between the tail 16 and the rear end of the undercarriage beam assemblies 42,44 as the tail 16 swings down to its ground-loading position of FIG. 8.

As illustrated in FIG. 13 in particular, the underside of the tail 16 is provided with a pair of normally horizontally extending tabs 186 that are fixed to the inboard surfaces of the beam webs 174 behind the pockets 184. Each of the tabs 186, is configured to be in fore-and-aft alignment with a corresponding retainer fork 88 (FIGS. 16 and 17) on the rear end of the corresponding gusset strap 86 overlying a corresponding track 82. Such portions of the tabs 186,188 become removably received within the retainer forks 88 when the tail 16 is in its transport position and the undercarriage 20 is in its rearmost roading position as illustrated in FIG. 5. This keeps the tail 16 stabilized during over-the-road travel and prevents bouncing of tail 16 relative to the main deck 14 and the undercarriage 20. As illustrated in FIG. 6, when the undercarriage 20 is shifted forwardly from its roading position of FIG. 5, the tabs 186,188 become spaced rearwardly from the retainer forks 88.

Figure 11:
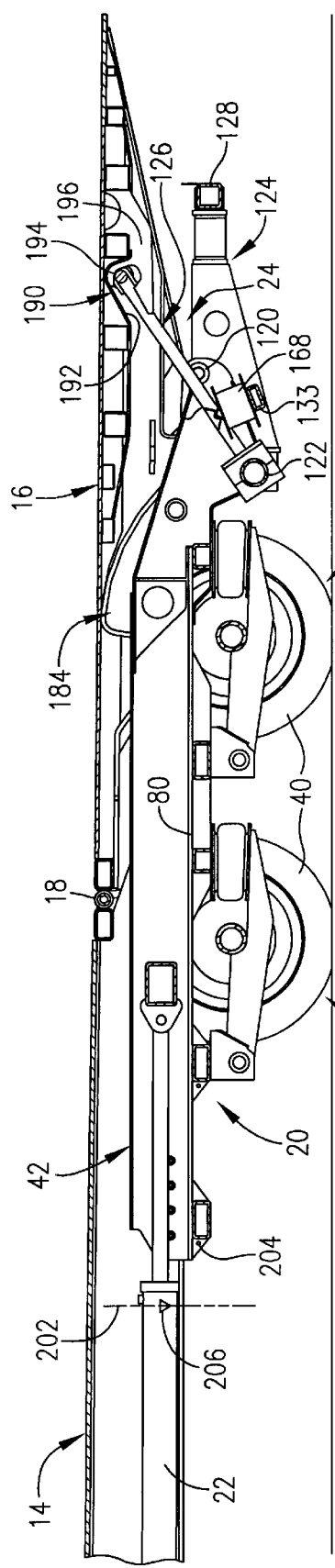
Figure 12:
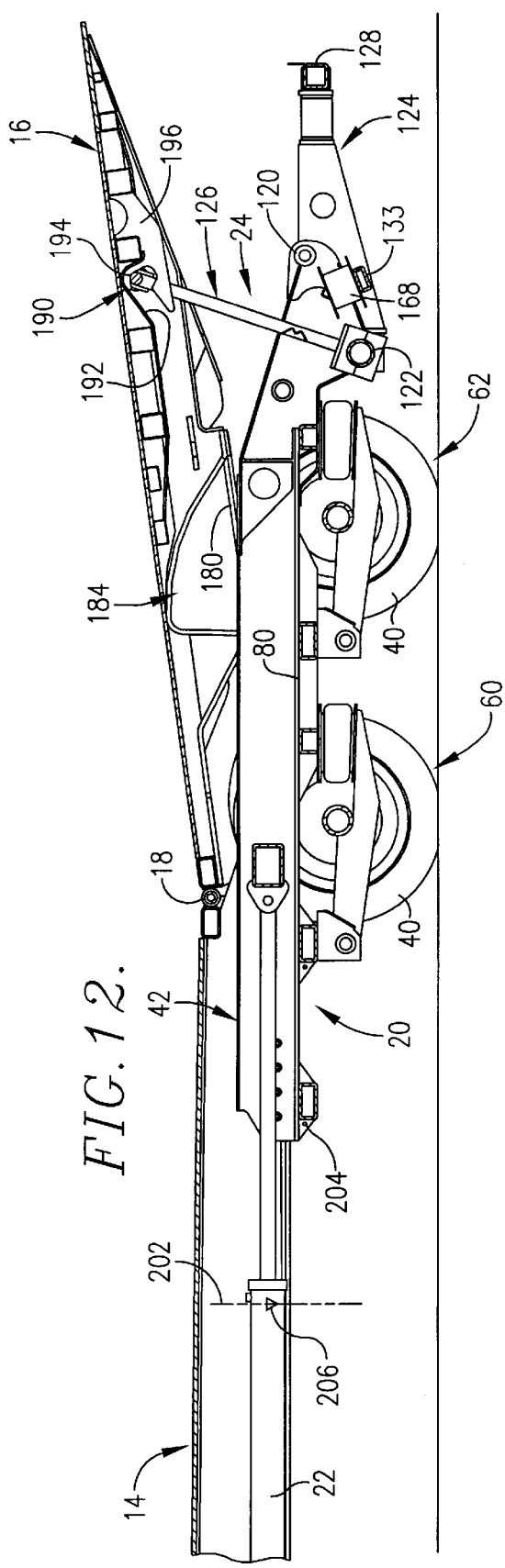

FIG. 13 also shows that a socket 190 is defined on the underside of the tail 16 inboard of the tail beams 170,172 and rearwardly of the pockets 184 in fore-and-aft alignment with the rollers 166 on the rear end of the lifting strut member 126. The socket 190 includes an upwardly and rearwardly inclined entry ramp 192 for the rollers 166, as well as a back wall 194 that prevents the rollers 166 from escaping rearwardly from the socket 190 once they are fully received therein. A pair of laterally spaced, forwardly opening safety hooks 196 project into the socket 190 from the rear and are located inboard of the wheels 166 so as to be in position to receive and retain the cross shaft 164 of the lifting strut 126 when the rollers 166 are fully received within the socket 190 as illustrated in FIGS. 11 and 12, for example. In the event that the tail 16 remains resting on a dock when in its dock-loading position of FIG. 12 and the undercarriage 20 is moved slightly forwardly, the cross shaft 164 drops into the bight 198 of the hooks 196 to prevent the lifting strut member 126 from becoming disengaged from the bottom of the tail 16. It will be noted that the socket 190 serves as a further portion of the mechanism 24 for controlling raising and lowering of the tail 16.

OPERATION

Generally speaking, the operation of the trailer 10 can be understood from reference to FIGS. 1–12. Although FIGS. 1 and 2 illustrate the trailer 10 disconnected from the towing tractor, it will be understood that the following description of the operation assumes that the trailer is connected to such tractor and utilizes the hydraulic supply pumps and like mechanism associated with the tractor to power the cylinder 22 that determines the position of the traveling undercarriage 20. Such tractor also supplies the pressurized air necessary to inflate the air bag actuator 168 and the air suspension bags 70 and 74.

FIG. 2 shows the undercarriage 20 in its rearmost roading position and the tail 16 in its level transport position. This corresponds to the condition of things in FIG. 5. In that condition, it will be seen that the tail 16 is fully supported by engagement of the glide strips 180 on the tail beams 170,172 with the lower flanges 80 of the undercarriage beam assemblies 42,44. In the event that the operator desires to lower the tail 16 to its ground-loading position as illustrated in FIG. 3, the cylinder 22 is retracted, causing the undercarriage 20 to shift forwardly from its FIG. 5 position through a segment of lost motion travel in which the tail 16 is not lowered, even though the undercarriage 20 has moved forwardly. This segment of lost motion travel extends from the roading position of the undercarriage illustrated in FIG. 5 to a point just rearward of the position illustrated in FIG. 6. It will be noted in this respect that until the undercarriage 20 is moved forwardly a sufficient distance that the glide strips 180 have moved beyond the end of the beam assemblies 42,44, the tail 16 cannot descend. Parenthetically, it is to be noted that each of the beam assemblies 42,44 has a notch 200 (FIGS. 6, 23, and 26) in the rearmost extremity of its lower flange 80 such that, as shown in FIG. 6, although the glide strips 180 have not entirely cleared the ends of the undercarriage beam assemblies 42,44, they have entered the notches 200 such that the tail 16 is no longer supported by the flanges 80.

As the undercarriage 20 moves beyond the forwardmost point of its lost motion travel, the follower rollers 120 enter the pockets 184 and come into load-bearing engagement with the parabolic ramps or straps 182. Thus, as the undercarriage 20 continues on forwardly as illustrated in FIG. 7, the rollers 120 climb up the undersides of the straps 182 deeper and deeper into the pockets 184, allowing the tail 16 to settle even further by gravity. Finally, as the undercarriage 20 reaches the forwardmost extent of its path of travel as illustrated in FIG. 8, the tail 16 reaches the ground, taking the load off the rollers 120 which are, by this time, deeply within the pockets 184 adjacent their point of deepest penetration. Due to engagement of the tail 16 with the ground surface at this time, coupled with slightly further forward movement of the undercarriage 20, the ground takes over the load of the tail 16 and the rollers 120 become relieved.

For purposes of clarity of understanding, FIGS. 5–12 have been provided with an imaginary indicator line 202 to provide a point of reference with respect to the various positions of the undercarriage 20. In actual practice, such reference line 202 is not in existence, although the operator does have the benefit of a position indicator rod 204 (FIG. 15) that is associated with the front cross beam 46 of the undercarriage 20 and projects laterally outwardly from underneath the trailer to a point it is visible to an operator standing alongside the trailer at its front end. The rod 204 is also visible on a reduced scale in FIGS. 2–12, as well as an arrowhead 206 on the outside of the main deck 14 so that the operator can readily determine the position of the undercarriage 20 by comparing the position of the rod 204 with the arrowhead 206. It will be noted that when the undercarriage 20 is in its rearmost roading position, the indicator rod 204 is substantially behind the arrowhead 206, while when the rollers 120 begin to enter the pockets 184 the rod 204 is slightly forward of the arrowhead 206. Thus, the forward limit of the lost motion segment of travel of the undercarriage 20 occurs when the indicator rod 204 is substantially aligned with or just slightly ahead of the arrowhead 206.

In order to raise the tail 16 from its ground-loading position of FIG. 8, the hydraulic cylinder 22 is extended so as to progressively shift the undercarriage 20 back toward its rearmost roading position of FIG. 5. As the undercarriage 20 moves rearwardly, the rollers 120 re-engage the parabolic straps 182 of the pockets 184 and begin lifting the tail 16. By the time the indicator rod 204 reaches the arrowhead 206 (slightly beyond the FIG. 6 position), the tail 16 will have been reestablished in its level transport position. Continued further rearward movement of the undercarriage 20 is simply lost motion insofar as further raising of the tail 16 is concerned, as the rollers 120 move rearwardly out of and beyond the pockets 184 and the glide strips 180 come into load-bearing engagement with the bottom flanges 80 of the undercarriage frame assemblies 42 and 44. Finally, the undercarriage 20 reaches its rearmost roading position as illustrated in FIG. 5.

It will be appreciated that during the raising and lower of the tail 16 between its transport position of FIG. 5 and its ground-loading position of FIG. 8, the bumper assembly 124 does not interfere with the tail 16. Instead, it will be seen that as the tail 16 moves down from its FIG. 5 position to its FIG. 6 position, the underside of the tail 16 comes into engagement with the bumper assembly 124. Further downward movement of the tail 16 simply causes the assembly 124 to swing downwardly about the pivot tube 122 under the resistance of the compression spring assemblies 146 illustrated in FIGS. 23–26. Such spring assemblies 146 are sufficiently yieldable as to permit the bumper assembly 124 to swing significantly downwardly from its level position in FIG. 5 to its downwardly and rearwardly inclined position of FIG. 8. As the tail 16 is returned back to its level transport position, the return spring assemblies 146 simply cause the bumper assembly 124 to return to its level condition until the back walls 152 of arms 130, 132 come into abutting engagement with the upright plates 138.

In the event that the operator wishes to raise the tail 16 to dock height as illustrated in FIG. 4, in which a dock 208 is illustrated in phantom lines, the sequence of events illustrated in FIGS. 9–12 are carried out. Initially, as shown in FIG. 9, the tail 16 is in its level, transport position with the undercarriage 20 at its rearmost roading position. In order to elevate the tail 16, the undercarriage 20 is first shifted forwardly through its lost-motion segment of travel until the indicator rod 204 becomes aligned with the arrowhead 206 as shown in FIG. 10. At this time, the load of the tail 16 is still carried by the lower flanges of the undercarriage rail assemblies 42,44, and the rollers 120 have not yet entered the pocket 184. The operator then actuates the air bag 168, which causes the lifting strut member 126 to be raised up out of its disabled position of FIG. 9 to its enabled position of FIG. 10 in which the rollers 166 bear against the bottom of the tail 16 just ahead of the socket 190.

Consequently, when the operator then reverses the cylinder 22 to shift the undercarriage 20 rearwardly from its FIG. 10 position, the rollers 166 slip up into the socket 190 under the influence of the air bag 168 as illustrated in FIG. 11. When the rollers 166 become fully seated within the socket 190, further rearward shifting of the undercarriage 20 causes the lifting strut member 126 to push the tail 16 upwardly (FIG. 12) as its pivot point at the cross tube 122 moves rearwardly underneath the axis of the rollers 166. By the time the undercarriage 20 has reached its rearmost roading position of FIG. 12, the tail 16 is fully raised and rigidly supported. In this position, vehicles and other objects can be moved off the dock 208 and down the tail 16 onto the main deck 14, or left on the tail 16 if desired.

Returning of the tail 16 to its transport position is a simple reversal of the above steps. By again retracting the cylinder 22, the undercarriage 20 is shifted forwardly from its FIG. 12 position to the forward end of its lost-motion segment of travel as illustrated in FIG. 10, during which movement point 122 for the lifting strut member 126 moves forwardly and allows the strut member to lower the tail until the glide strips 180 on tail beams 170 and 172 reestablish load supporting engagement with the flanges 80 of the undercarriage beams 42 and 44. Release of air pressure within the air bag 168 thereupon allows the strut member to return to its lowered, disabled position of FIG. 9, whereupon the cylinder 22 is extended to return the undercarriage 20 to its rearmost roading position.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A tail trailer comprising:

a deck assembly including a main deck and a tail, said tail being hingedly connected to said main deck for vertical movement between a level transport position, an upwardly inclined dock-loading position, and a downwardly inclined ground-loading position;

a wheeled undercarriage, said main deck and said tail being mounted on said undercarriage for support thereby, said undercarriage being shiftable relative to the main deck and the tail along a fore-and-aft path of travel toward and away from a rearwardly disposed roading position in which the undercarriage supports the main deck and the tail in the level transport position;

power apparatus operably coupled between said main deck and said undercarriage for effecting said shifting thereof; and mechanism operable to cause the undercarriage to raise and lower the tail between said transport position and a selected one of the dock-loading and ground-loading positions as the undercarriage is shifted along said path of travel, said path of travel of the undercarriage including a lost-motion segment forwardly adjacent said roading position within which the undercarriage continues to support both the main deck and the tail and the mechanism is inoperative to raise or lower the tail between the transport and ground-loading positions, said path of travel of the undercarriage further including a tail-operating segment forwardly of the lost-motion segment within which the undercarriage lowers the tail to the ground-loading position as the undercarriage shifts forwardly out from under the tail and raises the tail back up to the level transport position as the undercarriage shifts rearwardly back under the tail, said mechanism including a member on said undercarriage and a selectively operable actuator for selectively placing the member in either enabled or disabled positions, said member being disposed when in said enabled position to operably engage and raise the tail from its transport position toward its dock-loading position as the undercarriage is shifted rearwardly within the lost-motion segment of its path of travel and to then lower the tail back down to its transport position as the undercarriage is shifted forwardly within the lost-motion segment of its path of travel, said member being disposed when in said disabled position to remain operably disengaged from the tail throughout the path of travel of the undercarriage.

2. A tail trailer as claimed in claim 1, said actuator being pneumatically powered.

3. A tail trailer as claimed in claim 1, said member comprising a strut pivotally secured to the undercarriage and swingable by said actuator to said enabled position, said strut being swingable beyond said enabled position by the tail as the strut pushes the tail toward the dock-loading position in response to rearward shifting of the undercarriage.

4. A tail trailer as claimed in claim 3, said strut being disposed to gravitationally rest on the actuator in the disabled and enabled positions and to be lifted off the actuator by the tail as the strut pushes the tail toward the dock-loading position.

5. A tail trailer as claimed in claim 4, said actuator comprising an air-bag.

6. A tail trailer as claimed in claim 3, said tail having a pocket disposed for receiving and retaining an upper end of the strut against rearward movement relative to the tail when the strut is in its enabled position.

7. A tail trailer as claimed in claim 1, said mechanism including a recess on the tail and a supporting follower on the undercarriage, said recess having a sloping entry so disposed relative to the follower that the follower progressively enters the recess as the undercarriage is shifted forwardly within its tail-operating segment of travel and allows the tail to swing down by gravity toward the ground-loading position from the transport position.

8. A tail trailer as claimed in claim 7, said recess and said follower being spaced from one another in a fore-and-aft direction to such an extent when the undercarriage is in said roading position as to provide said lost-motion segment of travel of the undercarriage relative to the deck assembly during which the follower is out of said recess and the tail is not raised or lowered between the transport and ground-loading positions.

9. A tail trailer as claimed in claim 1; and a bumper assembly projecting rearwardly from the undercarriage in underlying relationship to said tail, said bumper assembly including a bumper pivotally secured to the undercarriage for vertical swinging movement toward and away from a normal raised position, said bumper assembly further including a spring yieldably biasing the bumper toward said raised position, said bumper being disposed to be engaged and forced downwardly out of said raised position by the tail against the action of said spring when the tail is lowered to said ground-loading position.

10. In a tail trailer, the improvement comprising:

a deck assembly including a main deck and a tail, said tail being hingedly connected to said main deck for vertical movement between a level transport position and a downwardly inclined ground-loading position;

a wheeled undercarriage, said main deck and said tail being mounted on said undercarriage for support thereby, said undercarriage being shiftable relative to the main deck and the tail along a fore-and-aft path of travel toward and away from a rearwardly disposed roading position in which the undercarriage supports the main deck and the tail in the level transport position;

power apparatus operably coupled between said main deck and said undercarriage for effecting said shifting thereof;

mechanism operable to cause the undercarriage to raise and lower the tail between said transport and ground-loading positions as the undercarriage is shifted along said path of travel; and a bumper assembly projecting rearwardly from the undercarriage in underlying relationship to said tail, said bumper assembly including a bumper pivotally secured to the undercarriage for vertical swinging movement toward and away from a normal raised position, said bumper assembly further including a spring yieldably biasing the bumper toward said raised position, said bumper being disposed to be engaged and forced downwardly out of said raised position by the tail against the action of said spring when the tail is lowered to said ground-loading position.

11. In a tail trailer as claimed in claim 10, said mechanism including a recess on the tail and a supporting follower on the undercarriage, said recess having a sloping entry so disposed relative to the follower that the follower progressively enters the recess as the undercarriage is shifted forwardly and allows the tail to swing down by gravity toward the ground-loading position from the transport position.

* * * * *